April 12, 1960     T. C. GERNER     2,932,529
STEERING IDLER ARM REPAIR UNIT
Filed Sept. 17, 1957
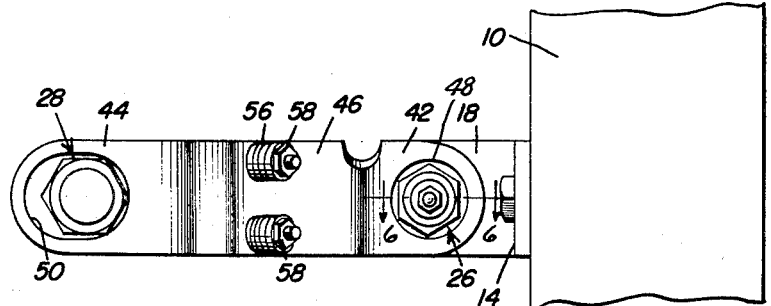
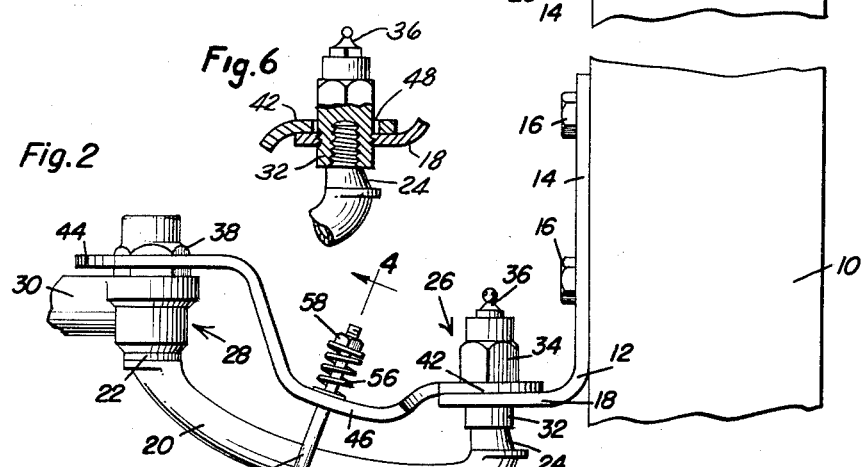
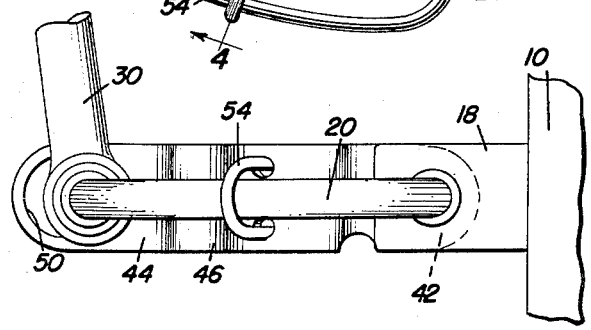
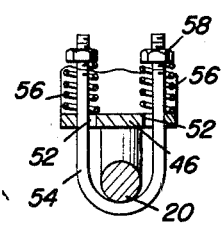
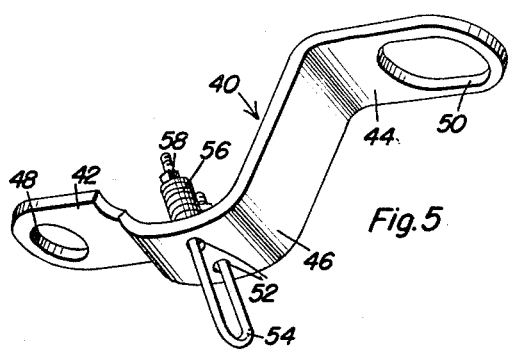
Theodore C. Gerner
        INVENTOR.

_United States Patent Office_

2,932,529
Patented Apr. 12, 1960

2,932,529

STEERING IDLER ARM REPAIR UNIT

Theodore C. Gerner, Oklahoma City, Okla.

Application September 17, 1957, Serial No. 684,484

6 Claims. (Cl. 280—95)

This invention comprises a novel and useful steering idler arm repair unit and more particularly relates to an attachment specifically designed for application to the steering idler arms of such steering assemblies as those of the well-known Ford or Mercury automobiles for taking up slack in the pivotal connections of such idler arms with their idler arm support brackets and the tie rods of the steering assembly.

The steering arm assemblies of certain automotive vehicles, such as Ford and Mercury automobiles employ a steering idler or control arm, sometimes known as a third arm, which has one end pivotally connected or journalled upon the support bracket carried by a cross member of the frame of the vehicle, with the idler arm projecting forwardly therefrom; the other end of this idler arm being in turn pivotally connected to a pair of tie rods which in turn are pivotally connected with the corresponding front wheels of the motor vehicle to thereby impart the necessary movements to these wheels during normal driving operations of the vehicle.

That pivotal connection by which the idler arm is hingedly mounted upon the support bracket for horizontal swinging movement thereon, in the steering assembly for the Ford and Mercury automobiles, includes a screw-threaded connection. Since there is necessarily some operative clearance in the screw threaded connection, in order to permit the desired swinging movement of the idler arm, wear quickly develops at this point introducing an undesirable amount of loss motion or slack in the connection of the idler arm to the support bracket and also to the tie rods. When this condition occurs, the efficiency of the steering system is detrimentally affected, such wear causing numerous objectionable conditions such as rattling, a disarrangement of the steering geometry of the front wheels, improper tracking of the tires and undue wear of the same which cannot be corrected by maintaining the caster, camber, toe-in and king-pin inclinations of the vehicle within the manufacturer's recommended specification. Heretofore, this condition has been corrected by replacing the third arm and its pivotal connections with the support bracket and the tie rods, this being a relatively costly and time-consuming operation. Moreover, when such replacement is made, it is again necessary to properly adjust the steering linkage to the required specifications for the particular automotive vehicle.

It is therefore the primary purpose of this invention to provide a repair assembly which shall effect a highly satisfactory repair of the condition of undue slack resulting from wear in the journals by which the third arm is secured to its support brackets and to the tie rods. A further important object of the invention is to provide a repair assembly which will not necessitate the replacement of the third arm or its pivotal connections with the support bracket and tie rods, that will resiliently take-up slack or wear in such connections and thereby restore the idler arm and its connections to full efficiency of operation.

Yet another object of the invention is to provide a repair unit in accordance with the preceding objects which may be quickly and easily applied to an idler arm for the purpose of resiliently taking up wear or slack in the journal connections of the same, and without the necessity for removing or replacing any parts of the associated steering assembly.

And a final important object of the invention to be specifically enumerated herein, resides in the provision of a repair assembly as set forth in the foregoing objects which shall be capable of use with idler arms of different lengths, without adjustment or change in the mode of attachment of the device to the idler arm or in the construction of the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary view, in top plan, showing the steering idler arm and associated parts of a steering mechanism with the present invention applied thereto;

Figure 2 is a side elevational view of the structure shown in Figure 1;

Figure 3 is a bottom plan of the arrangement shown in Figure 2;

Figure 4 is a vertical transverse sectional view taken substantially upon the plane indicated by the section line 4—4 of Figure 2 and showing the manner in which the device is resiliently secured to the idler arm;

Figure 5 is a perspective view of the attachment removed from the idler arm; and Figure 6 is a detail view taken in vertical section substantially upon the plane of the section line 6—6 of Figure 1.

In the accompanying drawings the numeral 10 designates a portion of a front or cross frame member forming a part of the chassis of a Ford or Mercury automobile, or any other automobile upon which the idler arm of a steering assembly is supported. Indicated at 12 is a mounting or support bracket, having a vertical leg 14 secured as by fastening bolts 16 to the frame member in a conventional manner, and having a horizontally, forwardly extending leg 18 which is centrally apertured.

The steering idler arm or third arm 20 has its opposite ends angularly disposed to provide end portions 22 and 24. Journalling means are connected to these end portions as set forth hereinafter.

Indicated generally by the numeral 26 is a journal means by which one angular end portion 24 of the idler arm is pivotally attached to the leg 18 of the support bracket 12. The other angulated portion 22 has a journalling means indicated generally by the numeral 28, the lower part of this journaling means being omitted, whereby the idler arm may be connected to the tie rods of the steering mechanism, as for example to the tie rod 30.

In the conventional steering assembly for which the present invention is adapted, the journalling means 26 consists of a sleeve 32 which is externally threaded and extends through the aperture in the leg 18 of the support bracket and is internally threaded at its lower end to receive the angulated end portion 24 of the idler arm which is externally threaded and is screwed into the downwardly projecting end of the sleeve 32. The idler arm is thus mounted for horizontal swinging movement by the screw-threaded engagement of the angulated portion 24 in the sleeve 32 below the support bracket 12. The upper portion of the sleeve is provided with a shouldered portion 34 which in turn may be provided with a lubricating fitting 36 of any conventional design, this shoulder portion lying above and abutting the upper side of the portion 42 of the strap 40 to thereby tightly secure the sleeve 32 in place in the bracket. It will thus be observed that the journalling means 26 has a portion extending above and another portion extending below the support bracket.

The other journalling means 28 which is connected by a threaded engagement to the angulated portion 22 of the idler arm 20, likewise is provided with a shouldered portion 38.

As so far described, the construction is conventional to the Ford and Mercury steering assembly and is similar to those of certain other automotive vehicles. In operation, horizontal swinging movement is imparted to the idler arm 20 by connection with the steering wheel, not shown, and the idler arm by means of the journal 28 in turn imparts motion to the tie rods 30 and thus by a mechanism not shown to the front wheels thereby steering the vehicle. In this conventional mechanism, owing to the threaded connection between the angulated portion 24 and the sleeve 32 of the journalling means 26, where it develops into threaded engagement therebetween. This in turn produces rattle, slack or lost motion which interferes with the efficiency and operation of the steering mechanism as hereinbefore set forth. During operation of the steering mechanism, when the wheels of the vehicle are being turned to either side, this lost motion is of no consequence. However, when the idler arm is in its neutral position, as when the vehicle is traveling straight ahead, the lost motion introduces undesirable slack or play into the steering mechanism and it is to correct this condition as efficiently and as easily and as economically as possible that the present invention is designed.

Referring now especialy to Figure 5 it will be observed that the repair unit of this mechanism comprises an elongated metal strap designated generally by the numeral 40, and which has substantially flat end portions 42 and 44, joined together by a curved, U-shaped or dished middle portion 46.

The end portion 42 is provided with an aperture 48 of sufficient size to be passed over the shouldered portion 34 of the journal member 26 and abut against the upper side of the bracket leg 18 as shown in Figure 2. The dished portion 46 is so spaced with reference to the end portions that it will conform to the contour of the idler arm 20 and project into the curved middle portion thereof as will be clearly apparent from Figure 2. The other end portion 44 is apertured by means of an elongated slot 50. The latter is of such a size that it may be freely passed over the shouldered portion 38 of the journal member 28. The elongation in this aperture is for the purpose of enabling one particular size of the strap 40 to accommodate the different spacings between the end portions 22 and 24 of different lengths of idler arms 20. The end portion 44 being adapted to pass over the shoulder portion 38 of the journal means 38 abuts against an enlargement thereon. Thus it will be observed that the strap conforms close to the contour of the idler arm and fits compactly therein and thereagainst as will be apparent from Figure 2.

At any convenient part of the mid-portion 46 there are provided a pair of apertures 52 and a fastening means in the form of a U-bolt 54 is received over the idler arm 20 and its mid-portion, passes through these apertures 52, and within the dished portion of the strap receives a pair of compression springs 56 secured thereto as by fastening nuts 58. It will thus be observed that by means of U-bolts, springs and nuts, the idler arm and the strap 40 are yieldingly urged toward each other; and since the ends of the idler arm abut against the mounting bracket 18 and the journalling means 28 of the tie rods, it is obvious that wear or play in these journal means is yieldingly taken up by the resilient force of the spring 56.

It will be further observed that the device may readily apply the idler arm of a steering mechanism without the necessity for dismounting or disconnecting the same in any way, thereby contributing to the ease of installation of the device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In the combination of a steering assembly including a mounting bracket on the frame of a vehicle, a steering idler arm, a journaling means mounting one end of said idler arm upon said mounting bracket for horizontal swinging movement, a journaling means connecting the other end of said idler arm to a steering tie rod; a repair unit comprising a strap having apertures in its opposite end portions receiving therethrough said journalling means, a fastener resiliently clamping the mid-portion of said strap to said idler arm with the strap end portions abutting said journaling means at opposite ends of said idler arm and with one end of said strap abutting said bracket whereby to exert resilient force against said bracket and journaling means and take up slack between the latter and said idler arm, said fastener comprising a U-bolt straddling the idler arm and resilient means secured to said U-bolt and engaging the mid-portion of said strap and yieldingly urging the idler arm and strap towards each other.

2. In a steering assembly for a vehicle, a mounting bracket secured to a cross member of a vehicle frame and having a horizontal arm, a curved steering idler arm having angulated ends, a journaling means secured to said horizontal arm and having opposite ends disposed above and below said horizontal arm, said idler arm having one angulated end portion mounted in said journaling means for horizontal swinging movement of said idler arm, another journaling means connecting the other angulated end portion of said idler arm to a steering tie rod and a slack take-up repair unit operatively connected to said journaling means and to said idler arm, said repair unit including an elongated strap, fastening means securing the strap to said idler arm, means for securing the opposite ends of said strap to said journaling means and one end of said strap to said horizontal arm, one end of said strap being apertured and receiving therethrough the end of the first mentioned journaling means projecting above said horizontal arm and abutting against the latter, the other end of said strap being apertured and receiving therethrough and abutting against said other journaling means, means comprising part of said fastener means yieldingly urging said strap and idler arm towards each other to thereby take up slack in said journaling means.

3. A slack and wear take-up unit for a steering assembly of the type including a mounting bracket on the frame of a vehicle and having an apertured horizontal leg, a steering idler arm, a journaling means pivotally connecting one end of said idler arm to a steering tie rod and another journaling means mounted upon said leg and extending through the aperture thereof and pivotally mounting the other idler arm end upon said leg for horizontal swinging movement; said unit comprising a strap having in its opposite end portions apertures of sufficient size and spacing to receive therein and to embrace and abut said journaling means, one end portion of said strap abutting said leg upon the opposite side thereof from said idler arm, a fastening means resiliently clamping together the midportions of said strap and idler arm and thereby apply resilient force to the pivotal connections of said idler arm.

4. The combination of claim 3 wherein the aperture of one strap end portion is elongated longitudinally of the strap whereby to provide clearance enabling the strap to receive in said apertures the journaling means of idler arms of different lengths.

5. The combination of claim 3 wherein said strap has a depression in its midportion extending into the curve in the midportion of the idler arm whereby to enable the strap to more closely conform to the curvature of the idler arm.

6. The combination of claim 3 wherein said strap has a pair of apertures in its midportion, said fastener comprising a U-bolt encircling said idler arm with its legs extending through said apertures, springs on said legs abutting said strap.

References Cited in the file of this patent

UNITED STATES PATENTS

| | | |
|---|---|---|
| 852,422 | Danguard | May 7, 1907 |
| 1,482,286 | Colley | Jan. 29, 1924 |
| 1,670,954 | Coleman | May 22, 1928 |
| 2,469,075 | Paun | May 3, 1949 |
| 2,588,544 | Langer | Mar. 11, 1952 |
| 2,772,126 | Guy | Nov. 27, 1956 |
| 2,797,929 | Herbenar | July 2, 1957 |
| 2,856,196 | Fowler | Oct. 14, 1958 |